United States Patent
Blanchard et al.

(10) Patent No.: US 6,200,926 B1
(45) Date of Patent: *Mar. 13, 2001

(54) AMMOXIDATION CATALYSTS FOR FLUIDIZED/MOVING BED REACTORS

(75) Inventors: Gilbert Blanchard, Belleville; Paolo Burattin, Paris, both of (FR); Fabrizio Cavani, Modena (IT); Stéfano Masetti; Ferruccio Trifiro, both of Bologna (IT)

(73) Assignee: R. P. Fiber & Resin Intermediates, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,446

(22) Filed: Dec. 19, 1996

Related U.S. Application Data

(60) Provisional application No. 60/015,479, filed on Apr. 12, 1996.

(30) Foreign Application Priority Data

Dec. 22, 1995 (FR) ................................. 95-15783

(51) Int. Cl.$^7$ ................. B01J 23/00; B01J 23/16
(52) U.S. Cl. ........................... 502/352; 502/353
(58) Field of Search .................... 502/352, 353

(56) References Cited

U.S. PATENT DOCUMENTS

| | | | |
|---|---|---|---|
| 4,447,612 | 5/1984 | Beschke et al. | 546/285 |
| 4,855,457 | * 8/1989 | Ramzi et al. | 549/239 |
| 4,870,195 | * 9/1989 | Riva et al. | 549/248 |
| 5,332,855 | 7/1994 | Blanchard et al. | 558/319 |
| 5,663,392 | * 9/1997 | Albonetti et al. | 556/28 |
| 5,686,381 | * 11/1997 | Albonetti et al. | 502/352 |

FOREIGN PATENT DOCUMENTS

| | | |
|---|---|---|
| 0 037 123 | 10/1981 | (EP). |
| 0 059 414 | 9/1982 | (EP). |
| 0 558 424 A1 | 9/1993 | (EP). |
| WO 95/05895 | 3/1995 | (WO). |

* cited by examiner

Primary Examiner—John F. Niebling
Assistant Examiner—Alexander G. Ghyka
(74) Attorney, Agent, or Firm—Burns, Doane, Swecker & Mathis, L.L.P.

(57) ABSTRACT

Solid catalysts suited for the fluidized/moving bed catalytic ammoxidation of alkanes comprise an active catalytic phase having the empirical formula (I):

$$VSb_aSn_bTi_cFe_dE_eO_x \qquad (I)$$

in which E is an element which provides an oxide of rutile structure or an element which, in combination with V, Sb, Sn, Ti, Fe and/or with another element E, provides a phase of rutile or trirutile structure, or a solid solution of rutile structure, a is a whole or fractional number equal to or greater than 0.5, b, c, d and e, independently, are each a whole or fractional number ranging from 0 to 100, and x is a whole or fractional number determined by the oxidation state of the other elements, such active catalytic phase being deposited onto/into particulates of a solid and porous oxidic support therefor, and are produced by (a) impregnating the solid and porous oxidic support with a solution, in at least one saturated alcohol, of compounds of vanadium and antimony and, optionally, compounds of tin and/or titanium and/or of iron and/or of element E, (b) contacting the solid and porous oxidic support thus impregnated with an aqueous buffer solution having a pH ranging from about 6 to 8, (c) separating the solids from such aqueous buffer solution and drying same, and (d) calcining the dried solids in two stages.

19 Claims, No Drawings

AMMOXIDATION CATALYSTS FOR FLUIDIZED/MOVING BED REACTORS

CROSS-REFERENCE TO COMPANION APPLICATION

Our copending Provisional Application No. 60/015,479, filed Apr. 12, 1996, the priority of which is hereby claimed.

BACKGROUND OF THE INVENTION

1. Technical Field of the Invention

The present invention relates to the preparation of mixed oxides based on vanadium, on antimony and, optionally, on tin and/or on titanium and/or on iron and/or on other metals deposited onto a support therefor and to the use of such supported mixed oxides as catalysts for the ammoxidation of alkanes.

2. Description of the Prior Art

Certain mixed oxides of vanadium and antimony, or of vanadium, antimony and other metals, are known compounds which have been described, among many other mixed oxides, in FR-A-2,072,334.

U.S. Pat. No. 5,008,427 describes the ammoxidation of propane or butane in the presence of a catalyst which can, in particular, comprise oxides of vanadium, of antimony and of iron or of titanium or of chromium or of gallium or of tin and, optionally, of other metals. These catalysts have the essential characteristic of having been calcined at a temperature equal to or greater than 780° C.

Similarly, EP-A-0,558,424 describes the ammoxidation of alkanes in the presence of a mixed oxide catalyst of vanadium, of antimony, of iron and/or of gallium and/or of indium. These mixed oxides are prepared by mixing aqueous suspensions of compounds of the various metals, heating with stirring and then evaporating the water, drying and calcination.

The aforesaid patent literature provides no specific advice regarding the reactor technology associated with the catalysts for the ammoxidation of alkanes which they describe.

However, for the type of reaction represented by the ammoxidation of alkanes, it transpires that employing a fluidized bed or moving bed reactor is more advantageous. Due to the high exothermicity of the reactions involved in the ammoxidation of alkanes, the possibility of using one or a number of stationary bed reactors (multitubular reactors) on an industrial scale does not appear very realistic, indeed excluded, in particular if it is desired to achieve high productivities. In fact, it would be necessary, in order to dissipate the heat evolved, to use a multitubillar reactor of very large size or an entire battery of multitubular reactors, which is not feasible from an economic standpoint.

In comparison with the stationary bed reactor, fluidized or moving bed reactors have a greater ability to dissipate the heat evolved and appear, for this reason, better suited for the ammoxidation reaction of alkanes. This better ability to transfer heat would permit enhancing productivity by increasing the alkane content in the feedstream mixture. Such an operation is not possible in the case of a stationary bed reactor because the limitations with respect to heat transfer (which can be detected by the existence of a hot spot in the reactor) dictate the use of relatively low alkane contents, to avoid any danger of explosiveness or flammability of the gas mixture.

SUMMARY OF THE INVENTION

The present invention features the production of a catalyst for a fluidized bed or moving bed reactor comprising an active catalyst phase having the empirical formula (I):

$$VSb_aSn_bTi_cFe_dE_eO_x \quad (I)$$

in which E is an element providing an oxide of rutile structure or an element which, in combination with V, Sb, Sn, Ti, Fe and/or with another element E, provides a phase of rutile or trirutile structure, or a solid solution of rutile structure; a is a whole or fractional number equal to or greater than 0.5; b, c, d and e, independently, are each a whole or fractional number ranging from 0 to 100; and x is a whole or fractional number determined by the oxidation number of the other elements; deposited onto a solid and porous oxide support.

The process for the production of the above catalyst comprises (a) impregnating the solid support with a solution in at least one saturated alcohol of the respective compounds of vanadium, of antimony and, optionally, of tin and/or of titanium and/or of iron and/or of element E, (b) contacting the impregnated solid support with an aqueous buffer solution at a pH of from 6 to 8, (c) separating the resulting solid and drying same, and (d) calcining the solid in two stages, first at a temperature of 300° C. to 350° C. and then at a temperature of 400° C. to 800° C.

DETAILED DESCRIPTION OF BEST MODE AND SPECIFIC/PREFERRED EMBODIMENTS OF THE INVENTION

More particularly according to the present invention, the elements E are advantageously selected from among germanium, manganese, ruthenium, niobium, tantalum, gallium, chromium, rhodium, nickel, molybdenum, aluminum, thorium, calcium, tungsten and magnesium. There may be a number of elements E in the formula (I) and it will be appreciated that the expression "element E," as intended herein, connotes one or more elements E.

The compounds of vanadium, of antimony, of tin, of titanium, of iron and of the element E employed in the subject process must be soluble in a saturated alcohol or a mixture of saturated alcohols.

Consistent herewith, a compound is regarded as soluble when its solubility, measured at 25° C., is at least 5 grams per liter of saturated alcohol. These compounds can be introduced together. They can also be first dissolved separately in an alcohol, the different alcoholic solutions thus obtained then being mixed with one another. Generally, the alcoholic solution is prepared by dissolving the different compounds of vanadium, of antimony and, if appropriate, of tin, of titanium, of iron and of element E, without the intermediate preparation of solutions of each of the compounds.

Suitable soluble vanadium compounds include vanadyl acetylacetonate, vanadyl trichloride, vanadium trifluoride, vanadium tetrafluoride, vanadium pentafluoride, vanadium tribromide, vanadium dichloride, vanadium trichloride, vanadium tetrachloride or vanadium triiodide.

Suitable soluble antimony compounds include antimony pentachloride, antimony trichloride, antimony tribromide, antimony trifluoride, antimony triiodide, antimony trioxide or stibine.

Suitable soluble tin compounds include stannic chloride, stannous chloride or stannous bromide.

Suitable soluble titanium compounds include titanium dichloride, titanium tetrachloride, titanium trichloride, titanium tribromide, titanium tetrabromide, titanium tetrafluoride or titanium diiodide.

And suitable soluble iron compounds include iron dichloride, iron trichloride, iron dibromide, iron tribromide, iron diiodide, ferrous nitrate, ferrous sulfate, ferric sulfate, ferrous thiosulfate, ferric formate, ferric acetate, ferric acetylacetonate, ferric benzoate, ferric oleate, ferrous lactate or ferric lactate.

The saturated alcohols employed in the process of the invention are advantageously alkanols and cycloalkanols, preferably those having a boiling point that is not excessively high, in order to facilitate the operations of separation or of recycling by distillation or evaporation. Thus, alkanols having from 1 to 6 carbon atoms, such as methanol, ethanol, n-propanol, 2-propanol, n-butanol, 2-butanol, tert-butanol, pentanols and hexanols, and cyclohexanol, are preferred.

The solid support is characteristically an oxide, such as an alumina, a silica, a silica/alumina, a zirconia, a cerite, a mixed oxide of cerium and of zirconium, a magnesia, a titanium oxide, a niobium oxide or a lanthanum oxide.

The size of the particles of the solid support generally ranges from 10 µm to 1,000 µm and preferably from 20 µm to 300 µm.

Another important characteristic of the solid support is its ability to be impregnated by a solution of the compounds of the metals of the active phase. Thus, supports are generally used having a total pore volume of at least 0.1 cm$^3$/g and preferably of at least 0.15 cm$^3$/g.

The quality of the fluidization of the catalytic bed can also depend on other parameters such as the relative density of the support, the void content of the support or the gas flow rate. The desired fluidization of the catalyst, in particular for application in the ammoxidation of alkanes, can be carried out under optimum conditions by one skilled in this art, taking account of these various parameters.

It is preferable, among solid supports exhibiting the characteristics indicated above, to use silicas.

The impregnation of the solid support by the alcoholic solution of the compounds of the metals constituting the composition of the active phase of formula (I) can be suitably carried out by using a volume of alcoholic solution which is less than or equal to the total pore volume of the support. When the volume of the alcoholic solution is less than the total pore volume of the support, it will generally constitute at least 50% of said total pore volume. The duration of the impregnation step is not critical. It can merely vary in practice according to the technique of mixing the support and the solution which is selected.

The impregnated solid support is then contacted with an aqueous buffer solution having a pH of from 6 to 8, preferably from 6.5 to 7.8, more preferably approximately 7, and preferably an aqueous solution of an ammonium salt, optionally containing aqueous ammonia. The ammonium salt is preferably an ammonium carboxylate (for example acetate, citrate or tartrate), ammonium oxalate, ammonium carbonate or ammonium hydrogenphosphate, which enables a pH of from 6 to 8, particularly in the region of 7, to be attained, optionally in the presence of aqueous ammonia. Thus, ammonium acetate/aqueous ammonia buffer solutions are particularly well suited.

The volume of the buffer solution with which the impregnated support is contacted is generally equal to or greater than the total pore volume of the support and is preferably greater than the total pore volume of the support.

The solid obtained can be separated from the liquid by any means commonly used for this operation, for example by filtration or by centrifuging.

It is then dried at a temperature which makes it possible to remove the water and which depends on the pressure under which the operation is carried out. If the operation is carried out at atmospheric pressure, the drying temperature will advantageously range from 100° C. to 200° C., preferably from 110° C. to 180° C. If the operation is carried out under a pressure less than atmospheric pressure, the drying temperature can be lower, generally equal to or greater than 50° C.

The duration of the drying can vary widely according to the temperature selected. It will generally be determined such as to remove most of the impregnated water. It most typically ranges from a few minutes to a few tens of hours.

The solid thus dried is calcined in an oven at a temperature of 300° C. to 350° C. and then at a temperature of 400° C. to 800° C., and more preferably from 500° C. to 750° C., for the second stage and for periods of time varying, typically, from a few minutes to several hours, most generally ranging from 30 minutes to 20 hours.

The ratio by weight, in the final catalyst, of the active phase of formula (I) to the total weight of the catalyst generally ranging from 5% to 50%.

Preferably, the mixed oxides of the active catalytic phase of formula (I) are those in which E is one or a more elements selected from among nickel, gallium, aluminum or niobium; a is a whole or fractional number equal to or less than 100 and preferably ranges from 0.5 to 50; b, c, d and e, independently, are each a whole or fractional number ranging from 0 to 50, at least one of which being greater than 0 and preferably equal to or greater than 0.5; and x is a whole or fractional number determined by the oxidation number of the other elements.

The present invention also features a process for the vapor phase ammoxidation of alkanes in a fluidized bed or moving bed reactor, in the presence of a catalytically effective amount of a catalyst comprising an active phase having the empirical formula (I):

$$VSb_aSn_bTi_cFe_dE_eO_x \qquad (I)$$

in which E is an element which provides an oxide of rutile structure or an element which, in combination with V, Sb, Sn, Ti, Fe and/or with another element E, provides a phase of rutile or trirutile structure, or a solid solution of rutile structure; a is a whole or fractional number equal to or greater than 0.5; b, c, d and e, independently, are each a whole or fractional number ranging from 0 to 100; and x is a whole or fractional number determined by the oxidation number of the other elements; deposited onto a solid support of oxide type, and said catalyst having been produced by the process described above.

According to present invention, alkanes, generally having from 3 to 12 carbon atoms per molecule, are reacted in the vapor phase with ammonia and oxygen, in the presence of the catalyst.

Of course, consistent with the present invention, diluent gases can be employed which are inert under the conditions of the reaction, such as helium, nitrogen and argon. Likewise, steam can be added to the gaseous reaction mixture in amounts which can vary over wide limits. Thus, the reactive gas (alkane, ammonia, oxygen) can be diluted with an inert diluent and/or with steam. In this instance, the steam content can vary over wide limits, in particular from 0% to 50% and preferably from 3% to 30% (by volume). Advantageously, the process according to the invention is carried out employing a reactive gas content of at least 3% and preferably at least 20% by volume.

The respective alkane, ammonia and oxygen contents in the reactive gas mixture can vary over wide limits. The alkane content in the reactive gas preferably ranges from 5% to 70% by volume. That of ammonia preferably ranges from 3% to 50% by volume and that of oxygen preferably ranges from 3% to 45% by volume.

Beginning with propane, which is preferred, a final reaction mixture can be obtained which essentially comprises acrylonitrile, an intermediate which is produced industrially on a vast scale.

Starting with isobutane, methacrylonitrile will essentially be obtained.

While the alkane used can be of technical quality, it desirably should not contain significant amounts of ethylenically unsaturated compounds. Thus, the propane used will generally contain only minor amounts of propylene, for example less than 10%.

As indicated above, the process according to the invention is carried out as a vapor phase reaction in a fluidized bed or moving bed reactor. The process can be carried out continuously or discontinuously.

The reaction temperature generally ranges from 300° C. to 550° C. and preferably from 400° C. to 500° C.

The total pressure of the reaction mixture is advantageously greater than or equal to atmospheric pressure. It generally ranges from 1 to 6 bar and preferably from 1 to 4 bar.

The hourly volume rate advantageously ranges from 100 to 36,000 $h^{-1}$. It depends principally on the gas flow rate, but also on other parameters of the reaction. The hourly volume rate preferably ranges from 200 to 20,000 $h^{-1}$.

The hourly volume rate is defined as the total gas volume/volume of the catalyst/hour ratio.

One skilled in this art will of course be able to determine a compromise between the temperature, the gas flow rate, the precise nature of the catalyst and the various other parameters of the reaction, taking account of production objectives.

The products of the reaction can be recovered from the effluent gases by any suitable means. For example, the effluent gases be directed into a condenser containing dilute sulfuric acid in order to neutralize the unreacted ammonia. The gases can then be transferred through a refrigerated absorbing column to condense the acrylonitrile, acetonitrile and hydrocyanic acid, the uncondensed vapors principally containing unreacted propane, propylene, light hydrocarbons and, if appropriate, $CO_2$. The acrylonitrile and hydrocyanic acid can then be separated from the acetonitrile by distillation and the recovered acrylonitrile/hydrocyanic acid mixture can in turn be distilled to separate the acrylonitrile from the hydrocyanic acid.

In order to further illustrate the present invention and the advantages thereof, the following specific examples are given, it being understood that same are intended only as illustrative and in nowise limitative.

EXAMPLES OF THE PREPARATION OF MIXED OXIDES

Example 1

Preparation of Catalyst (A) According to the Invention Comprising a Mixed Oxide Having the Empirical Formula $VSb_5Sn_5O_x$ and a Silica Support The dry impregnation was carried out (namely, utilizing a volume of solution which was less than or equal to the pore volume of the support) of 13 g of silica, having a particle size of 30 to 100 µm, a BET specific surface area of 320 $m^2/g$, a pore volume of 1.2 $cm^3/g$ and a relative density of 0.36, with 15.6 $cm^3$ of an ethanolic solution containing 2.15 g of $SnCl_4$, 0.437 g of vanadyl acetylacetonate and 2.46 g of $SbCl_5$.

The impregnated solid was poured into 150 $cm^3$ of an aqueous solution containing an ammonium acetate/aqueous ammonia (65/15 g/l) buffer and having a pH of 7.0.

The solid was then separated by centrifugation and dried at 120° C. for 24 hours.

It was then calcined for 1 hour at 350° C. and then for 3 hours at 700° C.

The catalyst thus obtained comprised 17% by weight of $VSb_5Sn_5O_x$ mixed oxide and 83% by weight of silica support and had a specific surface area of 280 $m^2/g$ and a relative density of 0.43.

Example 2

Preparation of Catalyst (B) According to the Invention Comprising a Mixed Oxide Having the Empirical Formula $VSb_5Sn_5O_x$ and an Alumina Support The dry impregnation was carried out (namely, utilizing a volume of solution which was less than or equal to the pore volume of the support) of 39 g of alumina, having a particle size of 20 to 90 µm, a BET specific surface area of 180 $m^2/g$, a pore volume of 0.4 $cm^3/g$ and a relative density of 0.74, with 15.6 $cm^3$ of an ethanolic solution containing 2.15 g of $SnCl_4$, 0.437 g of vanadyl acetylacetonate and 2.46 g of $SbCl_5$.

The impregnated solid was poured into 150 $cm^3$ of an aqueous solution containing an ammonium acetate/aqueous ammonia (65/15 g/l) buffer and having a pH of 7.0.

The solid was then separated by centrifugation and dried at 120° C. for 24 hours.

It was then calcined for 1 hour at 350° C. and then for 3 hours at 700° C.

The catalyst thus obtained comprised 6.5% by weight of $VSb_5Sn_5O_x$ mixed oxide and 93.5% by weight of alumina support and had a specific surface area of 150 $m^2/g$ and a relative density of 0.87.

Examples 3 to 5

Preparation of Catalysts (C), (D) and (E) According to the Invention Comprising Mixed Oxides Having the Empirical Formulae $VSb_{2.5}Sn_{2.5}O_x$, $VSb_5Sn_5O_x$ and $VSb_{2.5}Sn_{2.5}O_x$ and a Silica Support By repeating the procedure and employing the reactants described in Example 1 and by adapting, if appropriate, the amounts of said reactants, the following catalysts were prepared:

(a) Catalyst (C) comprising 17% by weight of $VSb_{2.5}Sn_{2.5}O_x$ mixed oxide and 83% by weight of silica support and having a specific surface area of 195 $m^2/g$;

(b) Catalyst (D) comprising 23% by weight of $VSb_5Sn_5O_x$, mixed oxide and 77% by weight of silica support and having a specific surface area of 235 $m^2/g$;

(c) Catalyst (E) comprising 23% by weight of $VSb_{2.5}Sn_{2.5}O_x$, mixed oxide and 77% by weight of silica support and having a specific surface area of 250 $m/^2g$.

GENERAL PROCEDURE FOR THE AMMOXIDATION TESTS

The catalytic activities of the catalysts (A) and (B) were evaluated in a glass fluidized bed reactor, having an internal diameter of 1.8 cm and with a height of 20 cm, equipped with an axial thermocouple, to permit monitoring the temperature along the catalytic bed. Approximately 15 cm$^3$ of catalyst were employed for each ammoxidation test; due to the difference in relative density between silica and alumina, this volume corresponded, for example, to 6.4 g for the catalyst (A) and to 13.0 g for the catalyst (B).

The reaction mixture used in the series of tests carried out in the fluidized bed reactor had the following composition, by volume: $C_3H_8/NH_3/O_2/He=25/10/20/45$.

The total pressure of the reaction mixture was 1.3 bar for each example.

The total gas flow rate was adjusted to provide different contact times; the contact time was calculated in consideration of the volume of the catalytic bed before fluidization (15 cm$^3$) and the gas flow rate under standard conditions of temperature and pressure. The contact times were as follows: 5 s (total flow rate: 180 cm$^3$/min), 10 s (total flow rate: 90 cm$^3$/min) and 15 s (total flow rate: 60 cm$^3$/min). The corresponding linear velocities of the gas (velocities in an empty chamber), calculated for standard conditions of temperature and pressure and taking account of the presence of the axial thermocouple in the reactor, were 105 cm/min, 52 cm/min and 35 cm/min.

The procedure for the ammoxidation test for propane was as follows:

(a') The catalyst was heated to a temperature $T_1$, for example 310° C., and, after stabilizing for 30 min at the temperature $T_1$, the composition of the mixture at the reactor outlet was determined by gas-phase chromatography.

(b') The conversion percentages and the selectivities obtained with respect to the catalyst examined at the inlet temperature $T_1$ were calculated using relationships of the type: conversion of propane (in mol %)=converted propane/introduced propane, selectivity towards acrylonitrile (in mol %)=propane converted to acrylonitrile/converted propane.

(c') The catalyst was then heated from 310° to 550° C. in increments of 20° C. and the conversion percentages and the selectivities were determined every 40 min.

In the ammoxidation Examples below, the following conventions are used:

Temp=temperature of the reaction
DC $C_3H_8$=conversion of propane
SACN=selectivity towards acrylonitrile
SACN+$C_3H_6$=selectivity towards acrylonitrile and propylene
SAmmox=selectivity towards acetonitrile, hydrocyanic acid and other ammoxidation byproducts
ct(s)=contact time in seconds.

The remainder to 100% of the selectivities corresponds to the formation of CO and $CO_2$ and, optionally, methane, ethane and ethylene.

EXAMPLES OF THE AMMOXIDATION OF PROPANE

Examples 6 to 10

Ammoxidation of propane was carried out, as described above, employing the catalysts A, B, C, D and E according to the invention.

It should be noted, by way of indication for the catalyst A, that the minimum fluidization flow rate was 9–10 cm$^3$/min (velocity in an empty chamber of 6 cm/min).

The expansion of the fluidized bed was linear as far as 60–70 cm$^3$/min (35–40 cm/min). The height of the catalytic bed changed from 10.8 cm (dense bed which was not fluidized for flow rates of less than the minimum fluidization flow rate) to 16.5 cm. For flow rates greater than 70 cm$^3$/min, the height of the catalytic bed no longer varied.

The temperature conditions and the results obtained are reported in the Table below:

TABLE

| Examples | Catalyst used | ct (s) | Temp (° C.) | DC $C_3H_8$ (in %) | SACN (in %) | SACN + $C_3H_6$ (in %) | SAmmox (in %) |
|---|---|---|---|---|---|---|---|
| Example 6 | A | 5 | 445 | 3.5 | 34 | 36 | 32 |
|  |  |  | 480 | 5 | 41 | 42 | 25 |
|  |  | 10 | 445 | 8 | 50 | 51 | 26 |
|  |  | 15 | 450 | 8 | 41 | 42 | 20 |
|  |  |  | 470 | 11 | 32 | 33 | 14 |
| Example 7 | B | 5 | 455 | 18 | 5 | 25 | 16 |
|  |  |  | 490 | 27 | 7 | 28 | 12 |
|  |  | 10 | 455 | 22 | 3 | 17 | 11 |
|  |  |  | 485 | 22 | 6 | 25 | 15 |
| Example 8 | C | 5 | 470 | 9 | 55 | 55 | 14 |
|  |  | 10 | 450 | 9 | 43 | 43 | 20 |
|  |  |  | 470 | 15 | 45 | 45 | 15 |
|  |  | 15 | 450 | 15 | 45 | 45 | 26 |
|  |  |  | 470 | 20 | 42 | 42 | 18 |
| Example 9 | D | 5 | 470 | 11 | 46 | 46 | 25 |
|  |  | 10 | 450 | 12 | 41 | 41 | 26 |
|  |  |  | 470 | 13 | 41 | 41 | 21 |
|  |  | 15 | 430 | 14 | 37 | 37 | 23 |
|  |  |  | 450 | 16 | 39 | 39 | 18 |
|  |  |  | 470 | 23 | 38 | 38 | 14 |
|  |  |  | 490 | 17 | 23 | 23 | 14 |
| Example 10 | E | 15 | 390 | 8 | 29 | 29 | 35 |
|  |  |  | 410 | 17 | 26 | 26 | 22 |
|  |  |  | 430 | 24 | 30 | 30 | 16 |
|  |  |  | 450 | 22 | 31 | 31 | 14 |

While the invention has been described in terms of various preferred embodiments, the skilled artisan will appreciate that various modifications, substitutions, omitions, and changes may be made without departing from the spirit thereof. Accordingly, it is intended that the scope of the present invention be limited solely by the scope of the following claims, including equivalents thereof.

What is claimed is:

1. A process for the production of a solid catalyst suited for the fluidized/moving bed catalytic ammoxidation of alkanes, said solid catalyst comprising an active catalytic phase having the empirical formula (I):

$$VSb_aSn_bTi_cFe_dE_eO_x \qquad (I)$$

in which E is an element which provides an oxide of rutile structure or an element which, in combination with V, Sb, Sn, Ti, Fe and/or with another element E, provides a phase of rutile or trirutile structure, or a solid solution of rutile structure, a is a whole or fractional number equal to or greater than 0.5, b, c, d and e, independently, are each a whole or fractional number ranging from 0 to 100, with the proviso that b is greater than 0, and x is a whole or fractional number determined by the oxidation state of the other elements, said active catalytic phase being deposited onto/into particulates of a solid and porous oxidic support therefor, said solid and porous oxidic support having a pore volume of at least 0.1 cm$^3$/g, and said process comprising (a) impregnating said solid and porous oxidic support with a solution, in at least one saturated alcohol, of compounds of vanadium and antimony and, optionally, compounds of tin and/or titanium and/or of iron and/or of element E, (b) contacting the solid and porous oxidic support thus impregnated with an aqueous buffer solution having a pH ranging from about 6 to 8, (c) separating the solids from said aqueous buffer solution and drying same, and (d) calcining said dried solids in two stages, first at a temperature ranging from about 300° C. to 350° C. and thence at a temperature ranging from 400° C. to 800° C.

2. An improved fluidized/moving bed reactor containing a mass of solid catalyst particulates and suited for the catalytic ammoxidation of alkanes, the improvement which comprises, as said solid catalyst particulates therefor, a solid catalyst comprising an active catalytic phase having the empirical formula (I):

$$VSb_aSn_bTi_cFe_dE_eO_x \qquad (I)$$

in which E is an element which provides an oxide of rutile structure or an element which, in combination with V, Sb, Sn, Ti, Fe and/or with another element E, provides a phase of rutile or trirutile structure, or a solid solution of rutile structure; a is a whole or fractional number equal to or greater than 0.5; b, c, d and e, independently, are each a whole or fractional number ranging from 0 to 100; and x is a whole or fractional number determined by the oxidation state of the other elements; said active catalytic phase being deposited onto/into particulates of a solid and porous oxidic support therefor, said solid catalyst prepared by a process comprising (a) impregnating said solid and porous oxidic support with a solution, in at least one saturated alcohol, of compounds of vanadium and antimony and, optionally, compounds of tin and/or titanium and/or of iron and/or of element E, (b) contacting the solid and porous oxidic support thus impregnated with an aqueous buffer solution having a pH ranging from about 6 to 8, (c) separating the solids from said aqueous buffer solution and drying same, and (d) calcining said dried solids in two stages, first at a temperature ranging from about 300° C. to 350° C. and thence at a temperature ranging from 400° C. to 800° C.

3. The fluidized/moving bed reactor of claim 2, wherein b is greater than 0.

4. A process for the production of a solid catalyst suited for the fluidized/moving bed catalytic ammoxidation of alkanes, said solid catalyst comprising an active catalytic phase having the empirical formula (I):

$$VSb_aSn_bTi_cFe_dE_eO_x \qquad (I)$$

in which E is one or more elements selected from the group consisting of germanium, manganese, ruthenium, niobium, tantalum, gallium, chromium, rhodium, nickel, molybdenum, aluminum, thorium, calcium, tungsten and magnesium; a is a whole or fractional number equal to or greater than 0.5, b, c, d and e, independently, are each a whole or fractional number ranging from 0 to 100, with the proviso that b is greater than 0 and at least one of c, d and e is greater than 0, and x is a whole or fractional number determined by the oxidation state of the other elements, said active catalytic phase being deposited onto/into particulates of a solid and porous oxidic support therefor, said solid and porous oxidic support having a pore volume of at least 0.1 cm³/g, and said process comprising (a) impregnating said solid and porous oxidic support with a solution, in at least one saturated alcohol, of compounds of vanadium and antimony and, optionally, compounds of tin and/or titanium and/or of iron and/or of element E, (b) contacting the solid and porous oxidic support thus impregnated with an aqueous buffer solution having a pH ranging from about 6 to 8, (c) separating the solids from said aqueous buffer solution and drying same, and (d) calcining said dried solids in two stages, first at a temperature ranging from about 300° C. to 350° C. and thence at a temperature ranging from 400° C. to 800° C.

5. The process as defined by claim 1, said solid and porous oxidic support comprising an alumina, a silica, a silica/alumina, a zirconia, a cerite, a mixed oxide of cerium and of zirconium, a magnesia, a titanium oxide, a niobium oxide, or a lanthanum oxide.

6. The process as defined by claim 1, said solid and porous oxidic support having a particle size ranging from 10 µm to 1,000 µm.

7. The process as defined by claim 1, wherein the ratio by weight in the final catalyst of the active catalytic phase of formula (I) to the total weight of the catalyst ranges from 5% to 50%.

8. The process as defined by claim 1, said soluble vanadium compound comprising vanadyl acetylacetonate, vanadyl trichloride, vanadium trifluoride, vanadium tetrafluoride, vanadium pentafluoride, vanadium tribromide, vanadium dichloride, vanadium trichloride, vanadium tetrachloride, or vanadium triiodide.

9. The process as defined by claim 1, said soluble antimony compound comprising antimony pentachloride, antimony trichloride, antimony tribromide, antimony trifluoride, antimony triiodide, antimony trioxide, or stibine.

10. The process as defined by claim 1, comprising impregnating said solid and porous oxidic support with a solution of stannic chloride, stannous chloride, or stannous bromide.

11. The process as defined by claim 1, comprising impregnating said solid and porous oxidic support with a solution of titanium dichloride, titanium tetrachloride, titanium trichloride, titanium tribromide, titanium tetrabromide, titanium tetrafluoride, or titanium diiodide.

12. The process as defined by claim 1, comprising impregnating said solid and porous oxidic support with a solution of iron dichloride, iron trichloride, iron dibromide, iron tribromide, iron diiodide, ferrous nitrate, ferrous sulfate, ferric sulfate, ferrous thiosulfate, ferric formate, ferric acetate, ferric acetylacetonate, ferric benzoate, ferric oleate, ferrous lactate, or ferric lactate.

13. The process as defined by claim 1, said at least one saturated alcohol comprising methanol, ethanol, n-propanol, 2-propanol, n-butanol, 2-butanol, tert-butanol, a pentanol, a hexanol, or cyclohexanol.

14. The process as defined by claim 1, comprising impregnating with a volume of alcoholic solution which is less than or equal to the total pore volume of said solid and porous oxidic support and said volume of alcoholic solution comprising at least 50% of said total pore volume.

15. The process as defined by claim 1, said aqueous buffer solution comprising an ammonium salt and, optionally, aqueous ammonia.

16. The process as defined by claim 1, wherein the volume of buffer solution contacted with the impregnated support is equal to or greater than the total pore volume of said support.

17. The process as defined by claim 1, wherein formula (I), E is one or more elements selected from among nickel, gallium, aluminum or niobium; a is a whole or fractional number equal to or less than 100; b, c, d and e, independently, are each a whole or fractional number ranging from 0 to 50, at least one of these being greater than 0; and x is a whole or fractional number determined by the oxidation state of the other elements.

18. The solid catalyst product of the process as defined by claim 1.

19. In a fluidized/moving bed reactor containing a mass of solid catalyst particulates and suited for the catalytic ammoxidation of alkanes, the improvement which comprises, as said solid catalyst particulates therefor, the solid catalyst product as defined by claim 18.

* * * * *